US012632771B2

(12) United States Patent
Griffin et al.

(10) Patent No.: US 12,632,771 B2
(45) Date of Patent: May 19, 2026

(54) OFFLINE DEBUGGING OF QUANTUM SERVICES USING SERVICE DEFINITION LAYERS

(71) Applicant: Red Hat, Inc., Raleigh, NC (US)

(72) Inventors: Leigh Griffin, Waterford (IE); Stephen Coady, Waterford (IE)

(73) Assignee: Red Hat, LLC, Raleigh, NC (US)

( * ) Notice: Subject to any disclaimer, the term of this patent is extended or adjusted under 35 U.S.C. 154(b) by 1027 days.

(21) Appl. No.: 17/685,077

(22) Filed: Mar. 2, 2022

(65) Prior Publication Data

US 2023/0281501 A1     Sep. 7, 2023

(51) Int. Cl.
*G06N 10/80*          (2022.01)
*G06F 11/3698*        (2025.01)
*G06N 10/20*          (2022.01)

(52) U.S. Cl.
CPC ......... *G06N 10/80* (2022.01); *G06F 11/3698* (2025.01); *G06N 10/20* (2022.01)

(58) Field of Classification Search
CPC ..... G06N 10/80; G06N 10/20; G06F 11/3698
See application file for complete search history.

(56) References Cited

U.S. PATENT DOCUMENTS 8,402,318 B2     3/2013   Nieh et al.
10,331,543 B2    6/2019   Marron et al.

| | | | |
|---|---|---|---|
| 11,270,220 | B1 * | 3/2022 | Richardson ........... G06F 9/5044 |
| 2007/0130172 | A1 * | 6/2007 | Lee ....................... G06F 16/284 |
| 2018/0096085 | A1 * | 4/2018 | Rubin .................... G16C 10/00 |
| 2019/0042392 | A1 | 2/2019 | Matsuura et al. |
| 2019/0179730 | A1 | 6/2019 | Geller et al. |
| 2020/0104739 | A1 | 4/2020 | Sharma et al. |
| 2020/0175414 | A1 | 6/2020 | Bishop et al. |
| 2020/0380397 | A1 | 12/2020 | Quintin |
| 2022/0276951 | A1 * | 9/2022 | Geller ................... G06N 10/70 |

OTHER PUBLICATIONS

PyQuil "pyQuil Documentation", Release 2.3.0, 2019, pp. 17, https://app.readthedocs.org/projects/pyquil/downloads/pdf/v2.3.0/.*

* cited by examiner

*Primary Examiner* — Li Wu Chang
(74) *Attorney, Agent, or Firm* — Dority & Manning, P.A.

(57)          ABSTRACT

Offline debugging of quantum services using service definition layers is disclosed herein. In one example, a processor device of a classical computing device generates a plurality of service definition layers based on a quantum service definition file, wherein each service definition layer corresponds to a respective one or more instructions of the quantum service definition file and comprises the one or more instructions and any preceding instructions. The processor device next instantiates a plurality of quantum simulator instances, each of which corresponds to one of the service definition layers. The processor device then executes the plurality of service definition layers using the corresponding plurality of quantum simulator instances.

16 Claims, 7 Drawing Sheets

— 46

START

GENERATE, BY A CLASSICAL COMPUTING DEVICE, A PLURALITY OF SERVICE DEFINITION LAYERS ASSOCIATED WITH A QUANTUM SERVICE DEFINITION FILE, WHEREIN EACH SERVICE DEFINITION LAYER CORRESPONDS TO A RESPECTIVE ONE OR MORE INSTRUCTIONS OF THE QUANTUM SERVICE DEFINITION FILE AND COMPRISES THE ONE OR MORE INSTRUCTIONS AND ANY PRECEDING INSTRUCTIONS
48

FOR EACH SERVICE DEFINITION LAYER OF THE PLURALITY OF SERVICE DEFINITION LAYERS:
50

OBTAIN START CONDITION METADATA AND END CONDITION METADATA RESULTING FROM EXECUTION OF THE SERVICE DEFINITION LAYER
52

STORE THE START CONDITION METADATA AND END CONDITION METADATA IN ASSOCIATION WITH THE SERVICE DEFINITION LAYER
54

INSTANTIATE, BY THE CLASSICAL COMPUTING DEVICE, A PLURALITY OF QUANTUM SIMULATOR INSTANCES, WHEREIN EACH QUANTUM SIMULATOR INSTANCE CORRESPONDS TO A SERVICE DEFINITION LAYER OF THE PLURALITY OF SERVICE DEFINITION LAYERS
56

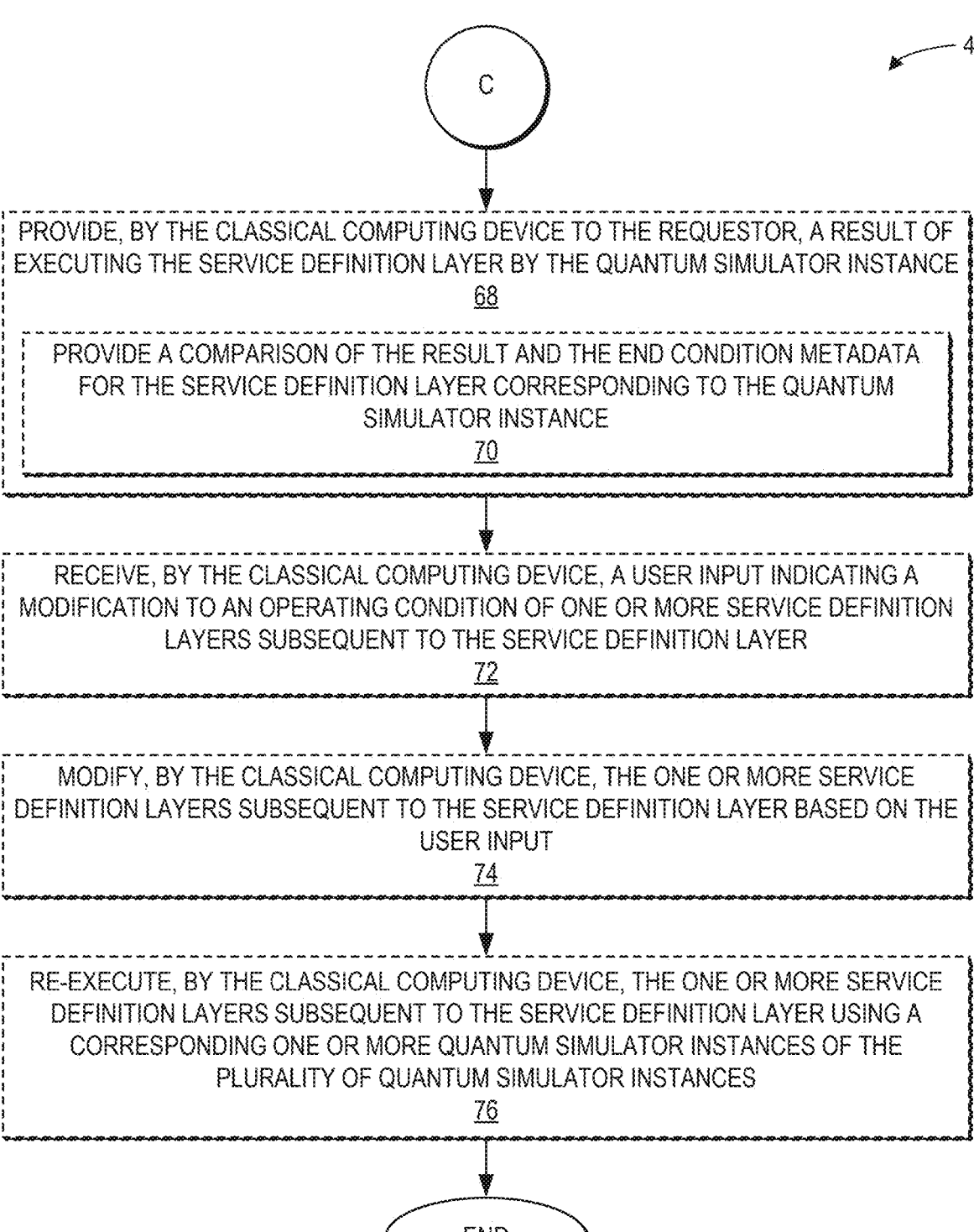

— 46

C

PROVIDE, BY THE CLASSICAL COMPUTING DEVICE TO THE REQUESTOR, A RESULT OF EXECUTING THE SERVICE DEFINITION LAYER BY THE QUANTUM SIMULATOR INSTANCE
68

PROVIDE A COMPARISON OF THE RESULT AND THE END CONDITION METADATA FOR THE SERVICE DEFINITION LAYER CORRESPONDING TO THE QUANTUM SIMULATOR INSTANCE
70

RECEIVE, BY THE CLASSICAL COMPUTING DEVICE, A USER INPUT INDICATING A MODIFICATION TO AN OPERATING CONDITION OF ONE OR MORE SERVICE DEFINITION LAYERS SUBSEQUENT TO THE SERVICE DEFINITION LAYER
72

MODIFY, BY THE CLASSICAL COMPUTING DEVICE, THE ONE OR MORE SERVICE DEFINITION LAYERS SUBSEQUENT TO THE SERVICE DEFINITION LAYER BASED ON THE USER INPUT
74

RE-EXECUTE, BY THE CLASSICAL COMPUTING DEVICE, THE ONE OR MORE SERVICE DEFINITION LAYERS SUBSEQUENT TO THE SERVICE DEFINITION LAYER USING A CORRESPONDING ONE OR MORE QUANTUM SIMULATOR INSTANCES OF THE PLURALITY OF QUANTUM SIMULATOR INSTANCES
76

END

*FIG. 2C*

OFFLINE DEBUGGING OF QUANTUM SERVICES USING SERVICE DEFINITION LAYERS

BACKGROUND

Quantum computing involves the use of quantum bits, referred to herein as "qubits," which have characteristics that differ from those of classical (i.e., non-quantum) bits used in classical computing. Qubits may be employed by quantum services that are executed by quantum computing devices to provide desired functionality. As quantum computing continues to increase in popularity and become more commonplace, functionality for debugging quantum services more efficiently and effectively will be desirable.

SUMMARY

The examples disclosed herein provide offline debugging of quantum services using service definition layers. In one example, a quantum debugging service, executing on a classical computing device, provides a mechanism for debugging quantum services "offline" (i.e., using the classical computing device rather than a quantum computing device) by generating service definition layers that are associated with a quantum service definition file. Each service definition layer corresponds to one or more instructions of the quantum service definition file and includes the one or more instructions and any preceding instructions. The service definition layers are then executed in a corresponding plurality of quantum simulator instances by the classical computing device.

In another example, a method for offline debugging of quantum services using service definition layers is disclosed. The method comprises generating, by a classical computing device, a plurality of service definition layers associated with a quantum service definition file, wherein each service definition layer corresponds to a respective one or more instructions of the quantum service definition file and comprises the one or more instructions and any preceding instructions. The method further comprises instantiating, by the classical computing device, a plurality of quantum simulator instances, wherein each quantum simulator instance corresponds to a service definition layer of the plurality of service definition layers. The method also comprises executing, by the classical computing device, the plurality of service definition layers using the corresponding plurality of quantum simulator instances.

In another example, a classical computing device for offline debugging of quantum services using service definition layers is disclosed. The classical computing device comprises a system memory, and a processor device communicatively coupled to the system memory. The processor device is to generate a plurality of service definition layers associated with a quantum service definition file, wherein each service definition layer corresponds to a respective one or more instructions of the quantum service definition file and comprises the one or more instructions and any preceding instructions. The processor device is further to instantiate a plurality of quantum simulator instances, wherein each quantum simulator instance corresponds to a service definition layer of the plurality of service definition layers. The processor device is also to execute the plurality of service definition layers using the corresponding plurality of quantum simulator instances.

In another example, a non-transitory computer-readable medium for offline debugging of quantum services using service definition layers is disclosed. The non-transitory computer-readable medium stores thereon computer-executable instructions that, when executed, cause one or more processor devices to generate a plurality of service definition layers associated with a quantum service definition file, wherein each service definition layer corresponds to a respective one or more instructions of the quantum service definition file and comprises the one or more instructions and any preceding instructions. The computer-executable instructions further cause the one or more processor devices to instantiate a plurality of quantum simulator instances, wherein each quantum simulator instance corresponds to a service definition layer of the plurality of service definition layers. The computer-executable instructions also cause the one or more processor devices to execute the plurality of service definition layers using the corresponding plurality of quantum simulator instances.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIGS. 2A-2C are flowcharts illustrating operations performed by the computing system of FIG. 1 for offline debugging of quantum services using service definition layers, according to one example;

DETAILED DESCRIPTION

Figure 1:
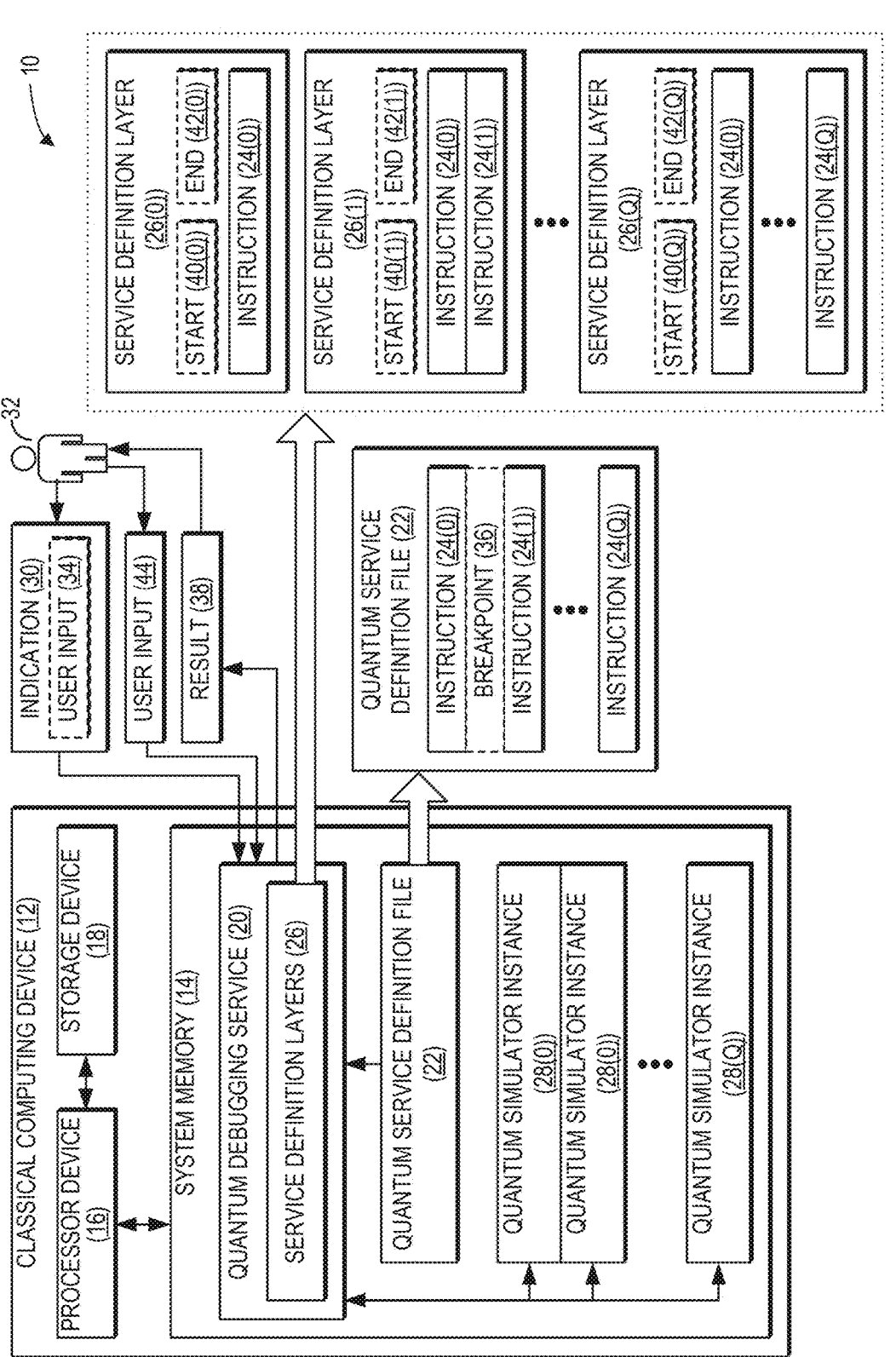
FIG. 1 is a block diagram of a computing system in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first quantum service" and "second quantum service," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," each of which has properties (such as superposition and entanglement) that differ from those of classical (i.e., non-quantum) bits used in classical computing. Qubits may be employed by quantum services that are executed by quantum computing devices to provide desired functionality. While qubits can be used to perform operations that would be impractical or impossible to perform with classical bits, qubits also suffer from inherent instabilities that may be caused by factors such as susceptibility to interference from their operating environments, faulty preparation, faulty gates, and the like. Additionally, qubits may be available only in limited numbers for use by quantum services executing on quantum computing devices. As a result, debugging quantum services on quantum computing devices may prove challenging. As quantum computing continues to increase in popularity and become more commonplace, functionality for debugging quantum services "offline" (i.e., using classical computing devices rather than quantum computing devices) will be desirable.

In this regard, examples disclosed herein implement a quantum debugging service for offline debugging of quantum services using service definition layers. The quantum debugging service is executed by a processor device of a classical computing device, and provides a mechanism for simulating real-time debugging of a quantum service that is defined by a quantum service definition file. The quantum service definition file comprises instructions for performing quantum operations, and may be, e.g., a Quantum Assembly (QASM) file, as a non-limiting example. The quantum debugging service generates and employs a plurality of service definition layers that are associated with the quantum service definition file. Each service definition layer corresponds to one or more instructions of the quantum service definition file, and includes the one or more instructions as well as any preceding instructions within the quantum service definition file.

For instance, a quantum service definition file that contains five (5) instructions may be associated with a corresponding five (5) service definition layers, as follows:

The first service definition layer corresponds to the first instruction within the quantum service definition file, and may comprise only the first instruction within the quantum service definition file;

The second service definition layer corresponds to the second instruction within the quantum service definition file, and may comprise the first and second instructions within the quantum service definition file;

The third service definition layer corresponds to the third instruction within the quantum service definition file, and may comprise the first, second, and third instructions within the quantum service definition file;

The fourth service definition layer corresponds to the fourth instruction within the quantum service definition file, and may comprise the first, second, third, and fourth instructions within the quantum service definition file; and The fifth service definition layer corresponds to the fifth instruction within the quantum service definition file, and may comprise the first, second, third, fourth, and fifth instructions within the quantum service definition file.

Note that, because the fifth service definition layer is effectively the same as the quantum service definition file, it may be omitted in some examples. Moreover, in some examples, each service definition layer may correspond to multiple instructions (e.g., where more than one instruction is required to accomplish a single task carried out by the quantum service).

To perform offline debugging of the quantum service definition file, the quantum debugging service instantiates a plurality of quantum simulator instances that each corresponds to one of the service definition layers. The quantum simulator instances may be instances of any classical application or executable framework that provides quantum simulation functionality, such as the Qiskit quantum computing framework, as a non-limiting example. The quantum debugging service then executes the plurality of service definition layers using the corresponding plurality of quantum simulator instances. Thus, for instance, in the example described above with five (5) service definition layers, a total of five (5) quantum simulator instances are instantiated, with the first quantum simulator instance being used to execute the first service definition layer, the second quantum simulator instance being used to execute the second service definition layer, and so forth in similar fashion. The quantum simulator instances in some examples may execute the corresponding service definition layers in parallel in the fashion of conventional classical multitasking operating systems.

After the service definition layers have completed execution, the output from the quantum simulator instances in some examples may be used to simulate a conventional debugging environment. For instance, in some examples, the quantum debugging service may receive an indication of a next instruction of the quantum service definition file from a requestor, such as a user or a classical application that employs the functionality of the quantum debugging service to provide a debugging environment. The indication in some examples may comprise, e.g., a user input indicating the next instruction, such as a user input indicating a step forward operation or a step backward operation (in which cases the next instruction may comprise an instruction immediately previous to or immediately subsequent to a current instruction) or an arbitrary selection of an instruction as the next instruction. Some examples may provide that the indication comprises a breakpoint in the quantum service definition file, in which case the next instruction may comprise an instruction in the quantum service definition file that is immediately subsequent to the breakpoint.

The quantum debugging service next identifies a service definition layer that corresponds to the next instruction, and further identifies a quantum simulator instance that corresponds to the service definition layer. The quantum debugging service then provides a result of executing the service definition layer by the quantum simulator instance to the requestor. For example, if the next instruction is the second instruction in the quantum service definition file, the quantum debugging service may identify the second service definition layer as the service definition layer that corresponds to the next instruction, and then identify the second quantum simulator instance as the quantum simulator instance in which the second service definition layer was executed. The quantum debugging service would then obtain the results of execution from the second quantum simulator instance, and would provide the result to the requestor. The result may comprise, e.g., a quantum state of a simulated qubit of the quantum simulator instance and/or a data value stored by a simulated qubit of the quantum simulator instance, as non-limiting examples. In examples in which the requestor is another application such as a classical application providing a debugging environment, the result may be provided to the application for display to a user. Examples in which the requestor is a user may provide that the quantum debugger service itself provides the result to the user.

Some examples may further provide that the operations for generating the service definition layers include obtaining start condition metadata and end condition metadata that results from execution of each service definition layer. For example, prior to generating the service definition layers, the quantum debugging service may execute, or cause to be executed, each of the service definition layers (e.g., using a quantum simulator or an actual quantum computing device). For each service definition layer, the quantum debugging service may obtain start condition metadata prior to execution of the service definition layer and may further obtain end condition metadata upon completion of execution of the service definition layer. The start condition metadata and the end condition metadata may comprise, e.g., data relating to the operating environment in which the service definition layer is executed, an availability of processing resources, an availability of quantum resources such as qubits, a data value and/or a state of qubits used during execution of the service definition layer, and/or the like. The start condition metadata and the end condition metadata may then be stored in association with the service definition layer.

In some examples, the quantum debugging service may use the start condition metadata to simulate the execution of the service definition layers more accurately by configuring each quantum simulator instance using corresponding start condition metadata for the service definition layer corresponding to the quantum simulator instance. Some examples may provide that the quantum debugging service may use the end condition metadata to provide a comparison of the result of executing a service definition layer using a quantum simulator instance and the end condition metadata that resulted from a previous execution of the service definition layer.

The quantum debugging service in some examples may also allow a user to modify an operating condition (e.g., a data value and/or a state of qubits used during execution of the service definition layers, as non-limiting examples) of service definition layers that follow a service definition layer for which results have been provided. In such examples, the quantum debugging service may receive a user input indicating a modification to an operating condition, such as a change to a data value stored by a qubit. Based on the user input, the quantum debugging service may modify one or more subsequent service definition layers (e.g., by inserting instructions within the one or more service definition layers to effect the modification). The quantum debugging service may then re-execute the one or more subsequent service definition layers using a corresponding one or more quantum simulator instances of the plurality of quantum simulator instances.

FIG. 1 is a block diagram of a computing system 10 according to one example. The computing system 10 includes a classical computing device 12 that comprises a system memory 14 and a processor device 16. The classical computing device 12 also comprises a storage device 18 that is communicatively coupled to the processor device 16, and that may comprise, e.g., a hard drive, a flash memory, or other persistent data storage device. It is to be understood that the computing system 10, according to some examples, may include more or fewer quantum computing devices and/or classical computing devices than illustrated in FIG. 1. Additionally, the classical computing device 12 in some examples may include constituent elements in addition to those illustrated in FIG. 1.

As quantum computing continues to increase in popularity and become more commonplace, functionality for debugging quantum services "offline" (i.e., using classical computing devices rather than quantum computing devices) will be desirable. Accordingly, in this regard, the processor device 16 of the classical computing device 12 executes a quantum debugging service 20 for offline debugging of quantum services using service definition layers. The quantum debugging service 20 provides a mechanism for simulating real-time debugging of a quantum service (not shown) that is defined by a quantum service definition file 22. As seen in FIG. 1, the quantum service definition file 22 comprises a plurality of quantum programming instructions (referred to herein as "instructions" and captioned as "INSTRUCTION" in FIG. 1) 24(0)-24(Q) for allocating and manipulating qubits and performing other quantum operations to achieve a desired functionality. The quantum service definition file 22 in some examples may comprise a QASM file, as a non-limiting example.

In exemplary operation, the quantum debugging service 20 generates a plurality of service definition layers 26(0)-26(Q) (collectively referred to herein as "service definition layers 26") based on the quantum service definition file 22. For instance, the quantum debugging service 20 may parse the quantum service definition file 22 and assign each of the instructions 24(0)-24(Q) to a corresponding service definition layer 26(0)-26(Q). In some examples, each of the instructions 24(0)-24(Q) may individually correspond to one of the service definition layers 26(0)-26(Q), while some examples may provide that multiple instructions 24(0)-24(Q) (e.g., instructions that together accomplish a particular task such as allocating a qubit) may correspond to one of the service definition layers 26(0)-26(Q). The quantum debugging service 20 may identify multiple instructions 24(0)-24(Q) as instructions to be grouped together within one of the service definition layers 26(0)-26(Q) based on formatting of the instructions 24(0)-24(Q) within the quantum service definition file 22, and/or based on generation rules (not shown) applied by the quantum debugging service 20 during generation of the service definition layers 26(0)-26(Q). The service definition layers 26(0)-26(Q) may then be stored in association with the quantum service definition file 22 (e.g., using the storage device 18 of the classical computing device 12).

In the example of FIG. 1, the service definition layer 26(0) includes only the instruction 24(0), while the service definition layer 26(1) includes the instructions 24(0)-24(1) and the service definition layer 26(Q) includes the instructions 24(0)-24(Q). Note that, because the service definition layer 26(Q) includes the same set of instructions as the quantum service definition file 22 itself, the service definition layer 26(Q) may be omitted in some examples. The service definition layers 26(0)-26(Q) each may comprise copies of the instructions contained therein or may comprise pointers or references to the instructions within the quantum service definition file 22.

The quantum debugging service 20 next instantiates a plurality of quantum simulator instances 28(0)-28(Q), each of which corresponds to one of the service definition layers 26(0)-26(Q). Each of the quantum simulator instances 28(0)-28(Q) may be an instance of any classical application or executable framework that provides quantum simulation functionality, such as the Qiskit quantum computing framework, as a non-limiting example. The quantum debugging service 20 then executes (i.e., by causing or initiating the execution of) the plurality of service definition layers 26(0)-26(Q) using the corresponding plurality of quantum simulator instances 28(0)-28(Q). In the example of FIG. 1, the quantum simulator instance 28(0) executes the service definition layer 26(0), the quantum simulator instance 28(1) executes the service definition layer 26(1), and the quantum simulator instance 28(Q) executes the service definition layer 26(Q). In some examples, the quantum simulator instances 28(0)-28(Q) execute the corresponding service definition layers 26(0)-26(Q) in parallel in the fashion of conventional classical multitasking operating systems.

After the service definition layers 26(0)-26(Q) have completed execution, the output from the quantum simulator instances 28(0)-28(Q) in some examples may be used to simulate a conventional debugging environment to enable offline debugging of the quantum service definition file 22. Some examples may provide that the quantum debugging service 20 receives an indication 30 of a next instruction of the quantum service definition file 22 from a requestor 32. The requestor 32 in some examples may comprise a user of the classical computing device 12, and the indication 30 may comprise a user input 34 that indicates the next instruction. The user input 34 may indicate, e.g., a step forward operation or a step backward operation (in which cases the next instruction may comprise an instruction immediately previous to or immediately subsequent to an instruction designated as a current instruction), or may comprise an arbitrary selection of one of the instructions 24(0)-24(Q) as the next instruction. In some examples, the requestor 32 may comprise a classical application (not shown) that employs the functionality of the quantum debugging service 20 to provide a debugging environment, and the indication 30 may comprises a breakpoint 36 in the quantum service definition file 22. In such examples, the next instruction may comprise an instruction in the quantum service definition file 22 that is immediately subsequent to the breakpoint 36. For purposes of illustration, it is assumed in the example of FIG. 1 that the next instruction is the instruction 24(1) in the quantum service definition file 22.

The quantum debugging service 20 next identifies the service definition layer 26(1) as the service definition layer that corresponds to the next instruction 24(1), and further identifies the quantum simulator instance 28(1) as the quantum simulator instance that corresponds to the service definition layer 26(1). The quantum debugging service 20 then provides a result 38 of executing the service definition layer 26(1) by the quantum simulator instance 28(1) to the requestor 32. Some examples may provide that the result 38 comprises a quantum state of a simulated qubit (not shown) of the quantum simulator instance 28(1) and/or a data value stored by a simulated qubit (not shown) of the quantum simulator instance 28(1), as non-limiting examples. In examples in which the requestor 32 is another application (not shown) such as a classical application providing a debugging environment, the quantum debugging service 20 may provide the result 38 to the application for display to a user, while examples in which the requestor 32 is a user may provide that the quantum debugger service 20 itself provides the result to the user.

According to some examples, the quantum debugging service 20, as part of the process for generating the service definition layers 26(0)-26(Q), may obtain start condition metadata (captioned as "START" in FIG. 1) 40(0)-40(Q) and end condition metadata (captioned as "END" in FIG. 1) 42(0)-42(Q) that results from execution of each service definition layer 26(0)-26(Q) in a quantum simulator or an actual quantum computing device. Thus, in such examples, the quantum debugging service 20 obtains start condition metadata 40(0)-40(Q) for each service definition layer 26(0)-26(Q) prior to execution, then executes (or causes to be executed) each service definition layer 26(0)-26(Q), and finally obtains end condition metadata 42(0)-42(Q) upon completion of execution of each service definition layer 26(0)-26(Q). The start condition metadata 40(0)-40(Q) and the end condition metadata 42(0)-42(Q) each may comprise, e.g., data relating to the operating environment in which each service definition layer 26(0)-26(Q) is executed, an availability of processing resources, an availability of quantum resources such as qubits, a data value and/or a state of qubits used during execution of each service definition layer 26(0)-26(Q), and/or the like. The start condition metadata 40(0)-40(Q) and the end condition metadata 42(0)-42(Q) are then stored in association with the corresponding service definition layers 26(0)-26(Q).

The quantum debugging service 20 in some examples may subsequently use the start condition metadata 40(0)-40(Q) to simulate the execution of the service definition layers 26(0)-26(Q) more accurately by configuring each quantum simulator instance 28(0)-28(Q) using corresponding start condition metadata 40(0)-40(Q). Some examples may provide that the quantum debugging service 20 may use the end condition metadata 42(0)-42(Q) to provide a comparison of the result 38 of executing one of the service definition layers 26(0)-26(Q) using the corresponding quantum simulator instance 28(0)-28(Q) and the end condition metadata 42(0)-42(Q) that resulted from a previous execution of the service definition layer 26(0)-26(Q).

The quantum debugging service 20 according to some examples may also allow a user to modify an operating condition (e.g., a data value and/or a state of qubits used during execution of the service definition layers 26(0)-26(Q), as non-limiting examples) of the service definition layers 26(0)-26(Q) that follow a service definition layer for which the result 38 has been provided (e.g., the service definition layer 26(1) in the example discussed above). In such examples, the quantum debugging service 20 may receive a user input 44 indicating a modification to an operating condition, such as a change to a data value stored by a qubit. Based on the user input 44, the quantum debugging service 20 may modify one or more subsequent service definition layers (e.g., the service definition layer 26(Q)) by, for example, inserting instructions within the service definition layer 26(Q) to effect the modification. The quantum debugging service 20 may then re-execute the service definition layer 26(Q) using the corresponding quantum simulator instance 28(Q), and may provide a result of the re-execution as described above.

It is to be understood that, because the quantum debugging service 20 is a component of the classical computing device 12, functionality implemented by the quantum debugging service 20 may be attributed to the computing system 10 generally. Moreover, in examples where the quantum debugging service 20 comprises software instructions that program the processor device 16 to carry out functionality discussed herein, functionality implemented by the quantum debugging service 20 may be attributed herein to the processor device 16. It is to be further understood that while, for purposes of illustration only, the quantum debugging service 20 is depicted as a single component, the functionality implemented by the quantum debugging service 20 may be implemented in any number of components, and the examples discussed herein are not limited to any particular number of components. Additionally, it is noted that while, for purposes of illustration and simplicity, the examples are illustrated as being implemented by a processor device set that includes a single processor device on a single computing device, in other environments, such as a distributed and/or clustered environment, the examples may be implemented on a computer system that includes a processor device set that includes a plurality of processor devices of a plurality of different computing devices, and functionality of the examples may be implemented on different processor devices of different computing devices. Thus, irrespective of the implementation, the examples may be implemented on a computer system that includes a processor device set made up of one or more processor devices of one or more computing devices.

Figure 2B:
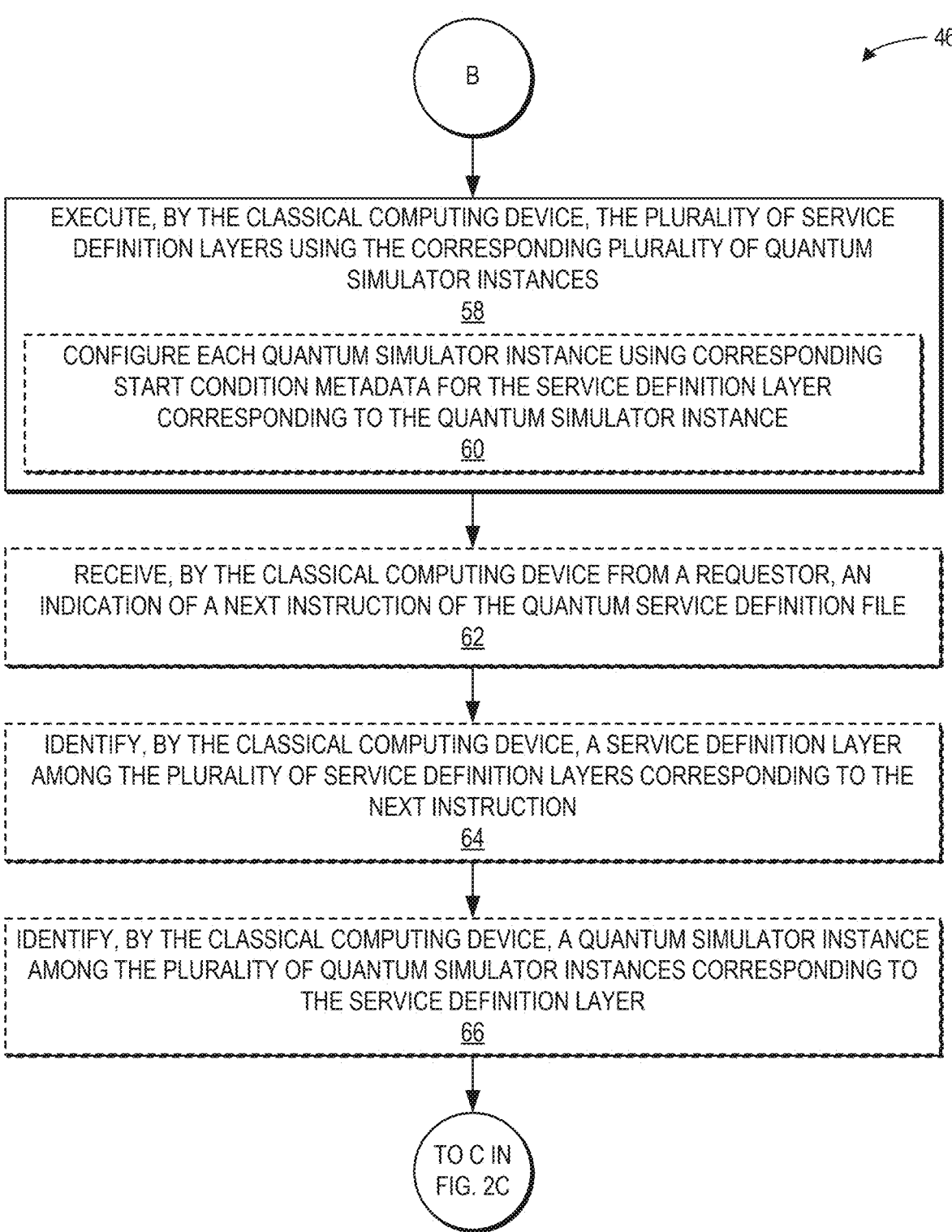

FIGS. 2A-2C provide a flowchart 46 to illustrate exemplary operations performed by the computing system 10 of FIG. 1 for offline debugging of quantum services using service definition layers according to one example. Elements of FIG. 1 are referenced in describing FIGS. 2A-2C for the sake of clarity. It is to be understood that, in some examples, some operations illustrated in FIGS. 2A-2C may be performed in an order other than illustrated herein, and/or may be omitted. In FIG. 2A, operations begin with the processor device 16 of FIG. 1 (e.g., by executing the quantum debugging service 20 of FIG. 1) generating a plurality of service definition layers (e.g., the service definition layers 26(0)-26(Q) of FIG. 1) associated with a quantum service definition file (e.g., the quantum service definition file 22 of FIG. 1), wherein each service definition layer corresponds to a respective one or more instructions (e.g., the instruction 24(1) of FIG. 1) of the quantum service definition file 22 and comprises the one or more instructions 24(1) and any preceding instructions (e.g., the instruction 24(0) of FIG. 1) (block 48).

In some examples, the operations of block 48 for generating the plurality of service definition layers 26(0)-26(Q) may comprise a series of operations performed for each service definition layer of the plurality of service definition layers 26(0)-26(Q) (block 50). The quantum debugging service 20 in such examples may first obtain start condition metadata (e.g., the start condition metadata 40(0)-40(Q) of FIG. 1) and end condition metadata (e.g., the end condition metadata 42(0)-42(Q) of FIG. 1) resulting from execution of the service definition layer 26(0)-26(Q) (block 52). The quantum debugging service 20 then stores the start condition metadata 40(0)-40(Q) and end condition metadata 42(0)-42(Q) in association with the service definition layer 26(0)-26(Q) (block 54). The quantum debugging service 20 instantiates a plurality of quantum simulator instances (e.g., the quantum simulator instances 28(0)-28(Q) of FIG. 1), wherein each quantum simulator instance corresponds to a service definition layer of the plurality of service definition layers 26(0)-26(Q) (block 56). Operations then continue at block 58 of FIG. 2B.

Referring now to FIG. 2B, the quantum debugging service 20 next executes the plurality of service definition layers 26(0)-26(Q) using the corresponding plurality of quantum simulator instances 28(0)-28(Q) (block 58). Some examples may provide that the operations of block 58 for executing the plurality of service definition layers 26(0)-26(Q) may comprise configuring each quantum simulator instance 28(0)-28(Q) using corresponding start condition metadata 40(0)-40(Q) for the service definition layer 26(0)-26(Q)

corresponding to the quantum simulator instance 28(0)-28(Q) (block 60). In this manner, the conditions under which the service definition layers 26(0)-26(Q) were previously executed (by a quantum simulator or by a quantum computing device) may be recreated by the quantum simulator instances 28(0)-28(Q).

According to some examples, the quantum debugging service 20 may receive, from a requestor, such as the requestor 32 of FIG. 1, an indication (e.g., the indication 30 of FIG. 1) of a next instruction, such as the instruction 24(1) of FIG. 1, of the quantum service definition file 22 (block 62). The quantum debugging service 20 may next identify a service definition layer (e.g., the service definition layer 26(1) of FIG. 1) among the plurality of service definition layers 26(0)-26(Q) corresponding to the next instruction 24(1) (block 64). The quantum debugging service 20 may then identify a quantum simulator instance (e.g., the quantum simulator instance 28(1) of FIG. 1) among the plurality of quantum simulator instances 28(0)-28(Q) corresponding to the service definition layer 26(1) (block 66). Operations in some examples may then continue at block 68 of FIG. 2C.

Turning now to FIG. 2C, the quantum debugging service 20 provides, to the requestor 32, a result (such as the result 38 of FIG. 1) of executing the service definition layer 26(1) by the quantum simulator instance 28(1) (block 68). In some examples, the operations of block 68 for providing the result 38 may comprise providing a comparison of the result 38 and the end condition metadata 42(0)-42(Q) for the service definition layer 26(1) corresponding to the quantum simulator instance 28(1) (block 70). Some examples may provide that the quantum debugging service 20 may receive a user input, such as the user input 44 of FIG. 1, indicating a modification to an operating condition of one or more service definition layers 26(Q) subsequent to the service definition layer 26(1) (block 72). In response, the quantum debugging service 20 may modify the one or more service definition layers (e.g., the service definition layer 26(Q) of FIG. 1) subsequent to the service definition layer 26(1) based on the user input 44 (block 74). The quantum debugging service 20 may then re-execute the one or more service definition layers 26(Q) subsequent to the service definition layer 26(1) using a corresponding one or more quantum simulator instances (e.g., the quantum simulator instance 28(Q) of FIG. 1) of the plurality of quantum simulator instances 28(0)-28(Q) (block 76).

Figure 3:
FIG. 3 is a simpler block diagram of the computing system of FIG. 1 for offline debugging of quantum services using service definition layers, according to one example.
Figure 3:
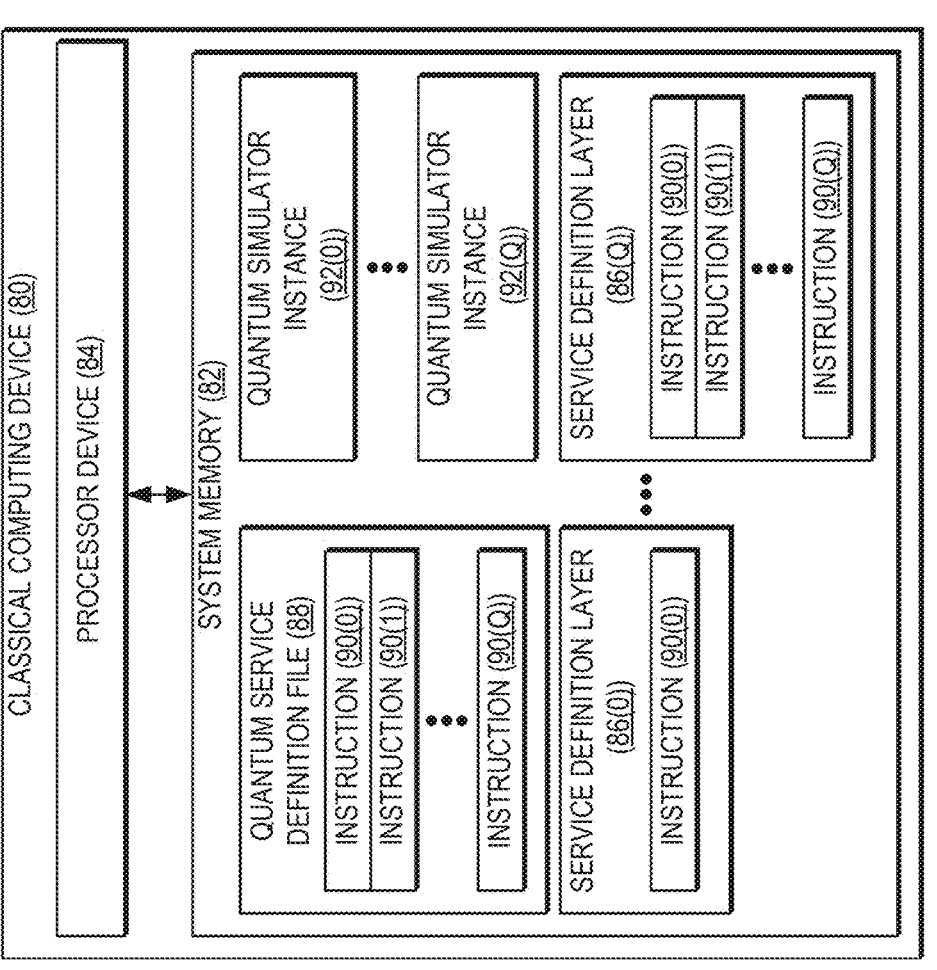

FIG. 3 is a simpler block diagram of the computing system 10 of FIG. 1 for offline debugging of quantum services using service definition layers, according to one example. In the example of FIG. 3, a computing system 78 includes a classical computing device 80 that comprises a system memory 82 and a processor device 84. In exemplary operation, the processor device 84 generates a plurality of service definition layers 86(0)-86(Q) based on a quantum service definition file 88, wherein each service definition layer (such as the service definition layer 86(Q)) corresponds to a respective one or more instructions (e.g., the instruction 90(Q)) of the quantum service definition file 88 and comprises the one or more instructions and any preceding instructions (such as the instructions 90(0)-90(1)). The processor device 84 next instantiates a plurality of quantum simulator instances 92(0)-92(Q), each of which corresponds to one of the service definition layers 86(0)-86(Q). The processor device 84 then executes the plurality of service definition layers 86(0)-86(Q) using the corresponding plurality of quantum simulator instances 92(0)-92(Q).

Figure 4:
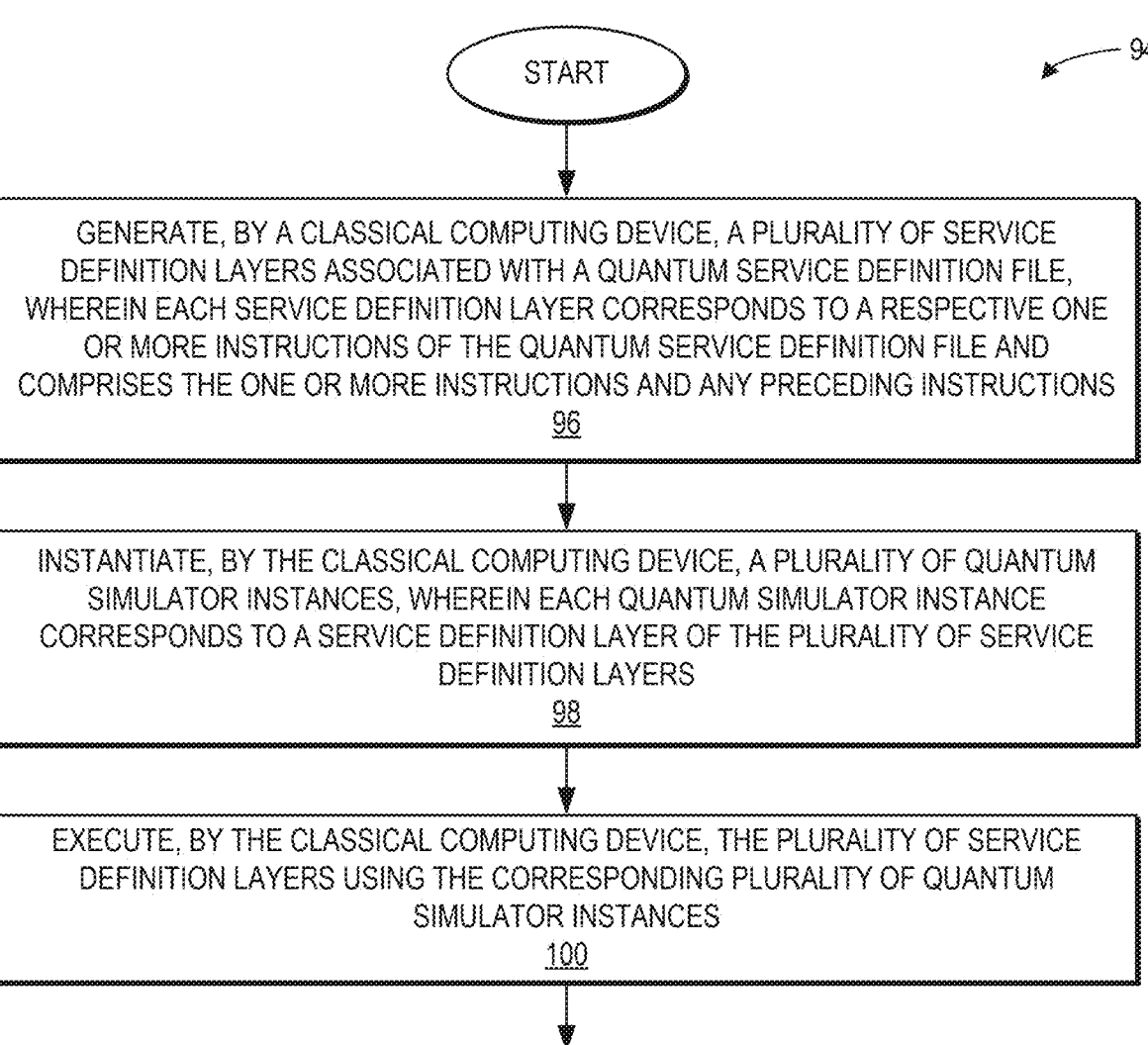
FIG. 4 is a flowchart of a simplified method for offline debugging of quantum services using service definition layers by the classical computing device of FIG. 3, according to one example.

To illustrate a simplified method for offline debugging of quantum services using service definition layers in the computing system 78 of FIG. 3 according to one example, FIG. 4 provides a flowchart 94. Elements of FIG. 3 are referenced in describing FIG. 4 for the sake of clarity. In FIG. 4, operations begin with the processor device 84 of the classical computing device 80 generating the plurality of service definition layers 86(0)-86(Q) associated with the quantum service definition file 88 wherein each service definition layer (such as the service definition layer 86(Q) of FIG. 3) corresponds to a respective one or more instructions (e.g., the instruction 90(Q) of FIG. 3) of the quantum service definition file 88 and comprises the one or more instructions and any preceding instructions (such as the instructions 90(0)-90(1) of FIG. 3) (block 96). The processor device 84 next instantiates a plurality of quantum simulator instances 92(0)-92(Q), wherein each quantum simulator instance corresponds to a service definition layer of the plurality of service definition layers 86(0)-86(Q) (block 98). The processor device 84 then executes the plurality of service definition layers 86(0)-86(Q) using the corresponding plurality of quantum simulator instances 92(0)-92(Q) (block 100).

Figure 5:
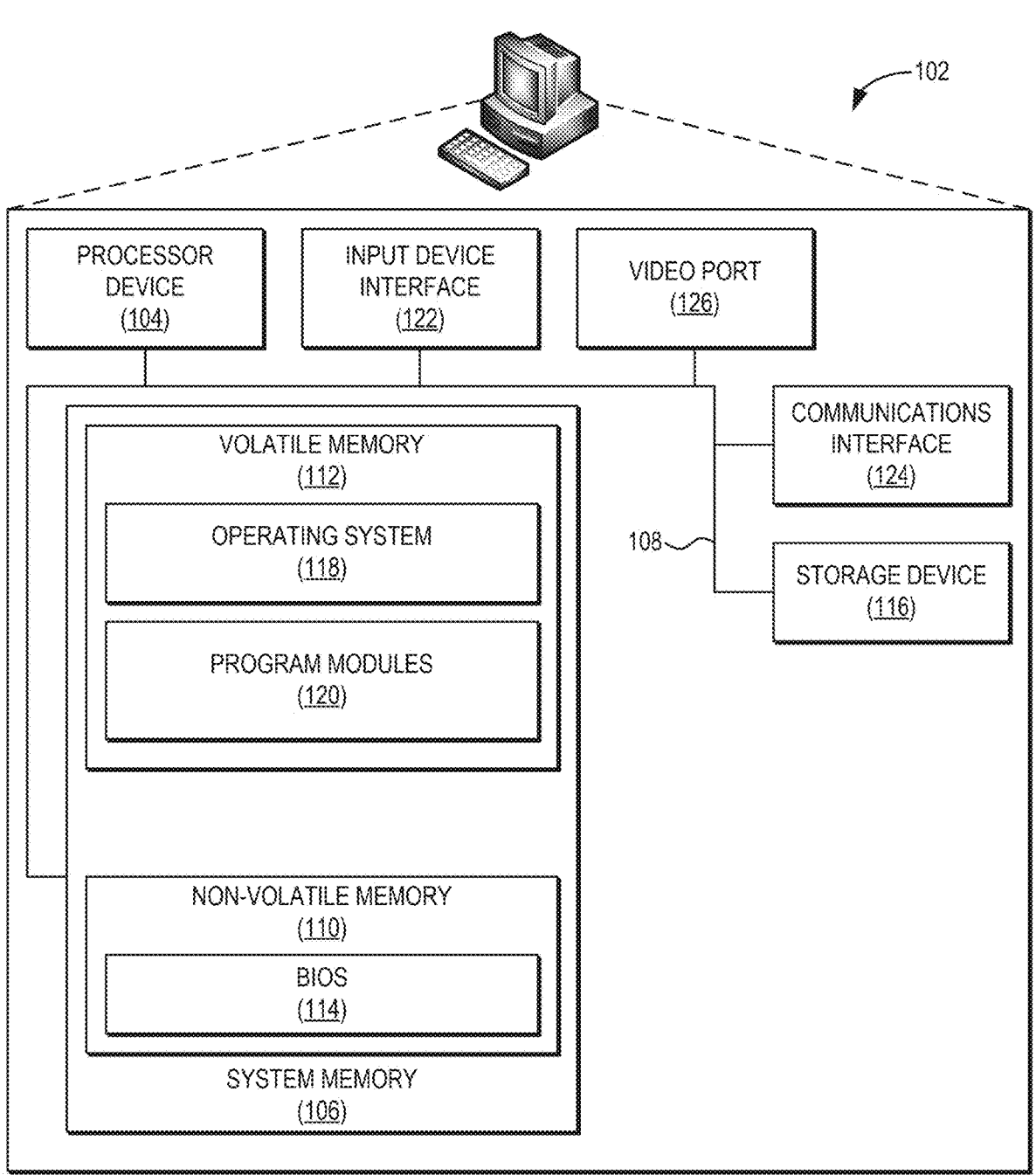
FIG. 5 is a block diagram of a classical computing device suitable for implementing examples, according to one example.

FIG. 5 is a block diagram of a processor-based computing device 102 ("computing device 102" or "classical computing device 102"), such as the classical computing device 12 of FIG. 1 in some examples, suitable for implementing examples according to one example. The computing device 102 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 102 includes a processor device 104, a system memory 106, and a system bus 108. The system bus 108 provides an interface for system components including, but not limited to, the system memory 106 and the processor device 104. The processor device 104 can be any commercially available or proprietary processor.

The system bus 108 may be any of several types of bus structures that may further interconnect to a memory bus (with or without a memory controller), a peripheral bus, and/or a local bus using any of a variety of commercially available bus architectures. The system memory 106 may include non-volatile memory 110 (e.g., read-only memory (ROM), erasable programmable ROM (EPROM), electrically EPROM (EEPROM), etc.), and volatile memory 112 (e.g., RAM). A basic input/output system (BIOS) 114 may be stored in the non-volatile memory 110 and can include the basic routines that help to transfer information among elements within the computing device 102. The volatile memory 112 may also include a high-speed RAM, such as static RAM, for caching data.

The computing device 102 may further include or be coupled to a non-transitory computer-readable storage medium such as a storage device 116, which may comprise, for example, an internal or external hard disk drive (HDD) (e.g., enhanced integrated drive electronics (EIDE) or serial advanced technology attachment (SATA)), for storage, flash memory, or the like. The storage device 116 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 116 and in the volatile memory 112, including an operating system 118 and one or more program modules 120 (e.g., the quantum debugging service 20 of FIG. 1) which may implement the functionality described herein in whole or in part. It is to be appreciated that the examples can be implemented with various commercially available operating systems 118 or combinations of operating systems 118. All or a portion of the examples may be implemented as a computer program product stored on a transitory or non-transitory computer-usable or computer-readable storage medium, such as the storage device 116, which includes complex programming instructions, such as complex computer-readable program code, to cause the processor device 104 to carry out the steps described herein. Thus, the computer-readable program code can comprise software instructions for implementing the functionality of the examples described herein when executed on the processor device 104. The processor device 104 may serve as a controller, or control system, for the computing device 102 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 104 through an input device interface 122 that is coupled to the system bus 108 but can be connected by other interfaces, such as a parallel port, an Institute of Electrical and Electronic Engineers (IEEE) 1394 serial port, a Universal Serial Bus (USB) port, an IR interface, and the like.

The computing device 102 may also include a communications interface 124 suitable for communicating with a network as appropriate or desired. The computing device 102 may also include a video port 126 to interface with a display device to provide information to a user.

Individuals will recognize improvements and modifications to the preferred examples of the disclosure. All such improvements and modifications are considered within the scope of the concepts disclosed herein and the claims that follow.

What is claimed is:

1. A method, comprising:
   generating, by a classical computing device, a plurality of service definition layers associated with a quantum service definition file, wherein each service definition layer corresponds to a respective one or more instructions of the quantum service definition file and comprises the one or more instructions and any preceding instructions associated with an immediately previous service definition layer, and wherein generating the plurality of service definition layers comprises, for each service definition layer of the plurality of service definition layers, obtaining start condition metadata and end condition metadata resulting from execution of the service definition layer;
   instantiating, by the classical computing device, a plurality of quantum simulator instances, wherein each quantum simulator instance corresponds to a service definition layer of the plurality of service definition layers;

configuring each quantum simulator instance using the corresponding start condition metadata for the service definition layer corresponding to the quantum simulator instance;

executing, by the classical computing device, the plurality of service definition layers using the corresponding plurality of quantum simulator instances; and providing, by the classical computing device, a comparison of a result of executing a first service definition layer of the plurality of service definition layers using a first quantum simulator instance of the plurality of quantum simulator instances and first end condition metadata resulting from execution of the first service definition layer.

2. The method of claim 1, further comprising:

receiving, by the classical computing device from a requestor, an indication of a next instruction of the quantum service definition file;

identifying, by the classical computing device, the first service definition layer among the plurality of service definition layers corresponding to the next instruction; and identifying, by the classical computing device, the first quantum simulator instance among the plurality of quantum simulator instances corresponding to the first service definition layer.

3. The method of claim 1, wherein the result comprises one or more of a quantum state of a simulated qubit of the first quantum simulator instance or a data value stored by a simulated qubit of the first quantum simulator instance.

4. The method of claim 2, wherein the indication of the next instruction comprises a user input indicating the next instruction.

5. The method of claim 2, wherein the indication of the next instruction comprises a breakpoint within the quantum service definition file.

6. The method of claim 1, wherein generating the plurality of service definition layers further comprises, for each service definition layer of the plurality of service definition layers:

storing the start condition metadata and the end condition metadata in association with the service definition layer.

7. The method of claim 1, further comprising:

receiving, by the classical computing device, a user input indicating a modification to an operating condition of one or more second service definition layers subsequent to the first service definition layer;

modifying, by the classical computing device, the one or more second service definition layers subsequent to the first service definition layer based on the user input; and re-executing, by the classical computing device, the one or more second service definition layers subsequent to the first service definition layer using a corresponding one or more second quantum simulator instances of the plurality of quantum simulator instances.

8. A classical computing device, comprising:

a system memory; and a processor device communicatively coupled to the system memory, the processor device to:

generate a plurality of service definition layers associated with a quantum service definition file, wherein each service definition layer corresponds to a respective one or more instructions of the quantum service definition file and comprises the one or more instructions and any preceding instructions associated with an immediately previous service definition layer, and wherein generating the plurality of service definition layers comprises, for each service definition layer of the plurality of service definition layers, obtaining start condition metadata and end condition metadata resulting from execution of the service definition layer;

instantiate a plurality of quantum simulator instances, wherein each quantum simulator instance corresponds to a service definition layer of the plurality of service definition layers;

configure each quantum simulator instance using the corresponding start condition metadata for the service definition layer corresponding to the quantum simulator instance;

execute the plurality of service definition layers using the corresponding plurality of quantum simulator instances; and provide a comparison of a result of executing a first service definition layer of the plurality of service definition layers using a first quantum simulator instance of the plurality of quantum simulator instances and first end condition metadata resulting from execution of the first service definition layer.

9. The classical computing device of claim 8, wherein the processor device is further to:

receive, from a requestor, an indication of a next instruction of the quantum service definition file;

identify the first service definition layer among the plurality of service definition layers corresponding to the next instruction;

identify the first quantum simulator instance among the plurality of quantum simulator instances corresponding to the first service definition layer.

10. The classical computing device of claim 8, wherein the result comprises one or more of a quantum state of a simulated qubit of the first quantum simulator instance or a data value stored by a simulated qubit of the first quantum simulator instance.

11. The classical computing device of claim 9, wherein the indication of the next instruction comprises a user input indicating the next instruction.

12. The classical computing device of claim 9, wherein the indication of the next instruction comprises a breakpoint within the quantum service definition file.

13. The classical computing device of claim 8, wherein to generate the plurality of service definition layers is to, for each service definition layer of the plurality of service definition layers:

store the start condition metadata and the end condition metadata in association with the service definition layer.

14. The classical computing device of claim 8, wherein the processor device is further to:

receive a user input indicating a modification to an operating condition of one or more second service definition layers subsequent to the first service definition layer;

modify the one or more second service definition layers subsequent to the first service definition layer based on the user input; and re-execute the one or more second service definition layers subsequent to the first service definition layer using a corresponding one or more second quantum simulator instances of the plurality of quantum simulator instances.

15. A non-transitory computer-readable medium having stored thereon computer-executable instructions that, when executed, cause one or more processor devices to:

generate a plurality of service definition layers associated with a quantum service definition file, wherein each service definition layer corresponds to a respective one or more instructions of the quantum service definition file and comprises the one or more instructions and any preceding instructions associated with an immediately previous service definition layer, and wherein generating the plurality of service definition layers comprises, for each service definition layer of the plurality of service definition layers, obtaining start condition metadata and end condition metadata resulting from execution of the service definition layer;

instantiate a plurality of quantum simulator instances, wherein each quantum simulator instance corresponds to a service definition layer of the plurality of service definition layers;

configure each quantum simulator instance using the corresponding start condition metadata for the service definition layer corresponding to the quantum simulator instance; execute the plurality of service definition layers using the corresponding plurality of quantum simulator instances; and provide a comparison of a result of executing a first service definition layer of the plurality of service definition layers using a first quantum simulator instance of the plurality of quantum simulator instances and first end condition metadata resulting from execution of the first service definition layer.

16. The non-transitory computer-readable medium of claim 15, wherein the computer-executable instructions further cause the one or more processor devices to:

receive, from a requestor, an indication of a next instruction of the quantum service definition file;

identify the first service definition layer among the plurality of service definition layers corresponding to the next instruction; and identify the first quantum simulator instance among the plurality of quantum simulator instances corresponding to the first service definition layer.

* * * * *